(12) United States Patent
Heath et al.

(10) Patent No.: US 8,760,669 B2
(45) Date of Patent: Jun. 24, 2014

(54) METHOD OF MEASURING THE THICKNESS OF A MOVING WEB

(75) Inventors: Stuart James Heath, Surrey (CA); Michael Kon Yew Hughes, Vancouver (CA); Graham Duck, Vancouver (CA)

(73) Assignee: Honeywell ASCa Inc., Mississauga (CA)

( * ) Notice: Subject to any disclaimer, the term of this patent is extended or adjusted under 35 U.S.C. 154(b) by 284 days.

(21) Appl. No.: 13/250,347

(22) Filed: Sep. 30, 2011

(65) Prior Publication Data

US 2013/0083332 A1 Apr. 4, 2013

(51) Int. Cl.
*G01B 11/28* (2006.01)

(52) U.S. Cl.
USPC ............................................. 356/630

(58) Field of Classification Search
USPC ............................................. 356/630
See application file for complete search history.

(56) References Cited

U.S. PATENT DOCUMENTS

| | | | |
|---|---|---|---|
| 4,160,204 A | 7/1979 | Holmgrem | |
| 5,087,313 A | 2/1992 | Duecker | |
| 5,094,535 A | 3/1992 | Dahlquist | |
| 5,166,748 A | 11/1992 | Dahlquist | |
| 5,327,082 A | 7/1994 | Gabura et al. | |
| 5,918,376 A | 7/1999 | Syre | |
| 6,281,679 B1* | 8/2001 | King et al. | 324/229 |
| 6,743,338 B2 | 6/2004 | Graeffe | |
| 6,936,137 B2 | 8/2005 | Moeller | |
| 6,967,726 B2 | 11/2005 | King | |
| 7,515,281 B2 | 4/2009 | Loopstra | |
| 7,528,400 B2 | 5/2009 | Duck | |
| 7,892,399 B2 | 2/2011 | Graham et al. | |
| 2003/0024301 A1* | 2/2003 | Graeffe et al. | 73/37.6 |
| 2009/0059244 A1* | 3/2009 | Hellstrom et al. | 356/630 |
| 2009/0260771 A1 | 10/2009 | Alev | |
| 2009/0260772 A1 | 10/2009 | Alev | |
| 2010/0078140 A1 | 4/2010 | Hughes | |

FOREIGN PATENT DOCUMENTS

| | | |
|---|---|---|
| CA | 2 390 198 A1 | 2/2002 |
| WO | 2009032094 A1 | 3/2009 |

OTHER PUBLICATIONS

PCT International Search Report and Written Opinion PCT/CA2012/000894 Jan. 17, 2013.
Quadracci et al., Heat Transfer of an Inclined Coanda Jet to a Flexible Web, ASME Paper 94-WA/HT21, Nov. 6, 1994.

* cited by examiner

*Primary Examiner* — Tarifur Chowdhury
*Assistant Examiner* — Omar Nixon
(74) *Attorney, Agent, or Firm* — Cascio, Schmoyer & Zervas

(57) ABSTRACT

Dual mounting head scanner system measures the thickness of a flexible continuous moving web such as paper by employing an optical senor positioned in the upper head to determine the distance between the optical sensor and the upper surface of the paper while a displacement sensor positioned in the lower head determines the distance between the displacement sensor, which includes an RF coil, and a reference surface on the upper head. An air clamp and vacuum source assembly on the operative surface of the lower head maintains the moving web in physical contact with a measurement surface that is incorporated in the operative surface. The optical sensor directs incident radiation onto the web at the measurement surface. Thermal isolation of the two sensors eliminates thermal interactions.

21 Claims, 3 Drawing Sheets

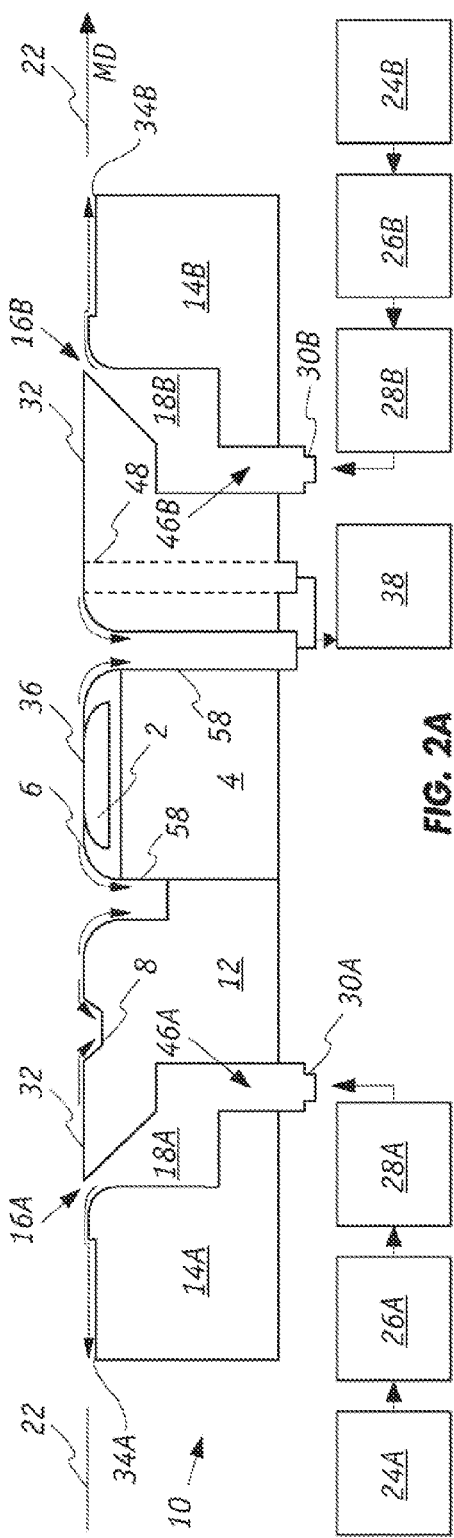
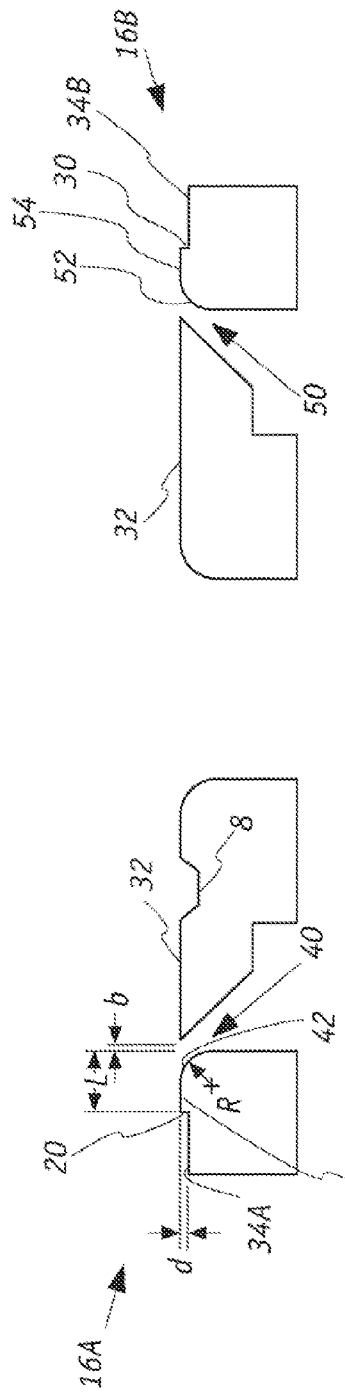
FIG. 2A
FIG. 2B
FIG. 2C

METHOD OF MEASURING THE THICKNESS OF A MOVING WEB

FIELD OF THE INVENTION

The present invention relates generally to a dual mounting head scanner system for measuring the thickness of a flexible continuous moving web. An air clamp and vacuum source assembly maneuvers the moving web into physical contact with a measurement surface that is incorporated in the operative surface of the lower head. An optical senor located in the upper head measures the distance between the optical sensor and the upper surface of the web while a displacement sensor located in the lower head measures the distance between the displacement sensor and a reference surface on the upper head. The optical sensor directs incident radiation onto the web at the measurement surface.

BACKGROUND OF THE INVENTION

In modern papermaking very high standards exist for many of the physical properties of a manufactured sheet. These properties are manipulated by complex control systems that require very accurate, robust measurements for control. Of these properties, thickness is a commonly required characteristic that poses significant problems for the measurement system. Many grades of paper are delicate and cannot be measured using conventional contacting measurement methods, which can either mark the sheet or tear it altogether. While non-contacting optical measurements of web thickness have been used, these techniques are extremely susceptible to errors that are caused by sheet motion. Sheet stabilization is the main technical hurdle to obtaining consistent measurements. The sheet must be held essentially flat within a narrow Measurement range even as the sheet travels at speeds that reach up to 120 km/h. The industry is in need of a non-marking, sub-micron accurate, thickness measurement apparatus.

SUMMARY OF THE INVENTION

In papermaking machines, sensors that are employed to measure paper properties are housed in enclosures that are scanned across the sheet as the paper is produced. These opposite-facing enclosures are positioned on either side of the sheet, which is approximately centered in the gap formed between them. Typically, a sensor includes two halves, each in its respective enclosure, on either side of the sheet. As the scanner moves laterally from one edge of the traveling sheet to the other, mechanical and thermal variations cause the distance between the two enclosures to change.

The precise positions of both sides of a sheet must be identified in order to make accurate dynamic sheet thickness measurements. With the inventive technique, the lower side of the moving sheet is held against a flat measurement surface. Subsequently, the distance from an opposing side on the upper enclosure to the exposed, visible upper side of the moving sheet is measured with an optical sensor, such as a laser triangulation device, while, simultaneously, the position of the optical sensor from the lower side holding the sheet is measured, preferably with an electromagnetic induction sensor. The thickness of the sheet will be the difference between the two distance measurements with a constant offset.

The present invention is based in part on the development of an air clamp or stabilizer and vacuum assembly that subjects a moving flexible web, which is traveling in the machine direction, to forces sufficient to support and pull the web toward a measurement surface that is formed on an operative surface. In particular, suction forces generated by vacuum channels that are configured adjacent the measurement surface flatten the contour of the web and holds the web in physical contact against the measurement surface as the web passes over the measurement surface. The above-described two distance measurements are conducted as the moving web is held on the measurement surface thereby yielding accurate continuous web thickness measurements.

In one aspect, the invention is directed to a detector device for contact support of a flexible continuous web being monitored and that is moving in a downstream machine direction, that includes:
 (a) a first mounting head disposed on a first side of the moving web;
 (b) a second mounting head disposed on a second side of the moving web and which comprises a body having an operative surface facing the second side of the web wherein the operative surface defines a measurement surface and has a web entry end and a web exit end that is downstream from the web entry end;
 (c) a displacement sensor that is positioned in the second mounting head to determine a distance from the displacement sensor to a reference surface on the first mounting head; and
 (d) means for positioning the moving web such that the second side of the web comes into contact with the measurement surface as the web passes over the measurement surface.

In another aspect, the invention is directed to a system for dynamic thickness measurements of a flexible continuous web, that has a first surface and a second surface, and which is moving in a downstream machine direction (MD) that includes:
 (a) a first mounting head disposed adjacent to the first side of the web, the first mounting head including:
  (i) a first operative surface facing the first side of the web; and
  (ii) an optical sensor for measuring the distance from the optical sensor to the first side of the web; and
 (b) a second mounting head disposed adjacent to the second side of the web, the second mounting head including:
  (i) a body having a second operative surface facing the second side of the web wherein the second operative surface defines a measurement surface wherein the first operative surface and the second operative surface define a measurement gap, that has a web entry end and a web exit end that is downstream from the web entry end, through which the continuous web travels;
  (ii) an air stabilizer that supports the flexible continuous web as the web travels through the measurement gap;
  (iii) a first vacuum channel formed on the second operative surface that applies a suction force on the web to maintain the web in contact with the measurement surface as the web passes over the measurement surface; and
  (iv) a displacement sensor that determines a distance from the displacement sensor to a reference surface on the first mounting head.

In yet another aspect, the invention is directed to a method of measuring the thickness of a flexible continuous web that is moving in a downstream machine direction (MD) along a path that includes the steps of:
 (a) maneuvering the continuous web through a dual scanner head that includes:

(i) first mounting head disposed adjacent to a first side of the web, the first mounting head including:
  (A) a first operative surface facing the first side of the web; and
  (B) an optical sensor for measuring the distance from the optical sensor to the first side of the web; and
(ii) a second mounting head disposed adjacent to the second side of the web, the second mounting head including:
  (A) a body having a second operative surface facing the second side of the web wherein the second operative surface defines a measurement surface wherein the first operative surface and the second operative surface define a measurement gap, that has a web entry end and a web exit end that is downstream from the web entry end, through which the continuous web travels;
  (B) an air stabilizer that supports the flexible continuous web as the web travels through the measurement gap;
  (C) a first vacuum channel formed on the second, operative surface that applies a suction force on the web to maintain the web in contact with the measurement surface as the web passes over the measurement surface; and
  (D) a displacement sensor that determines a distance from the displacement sensor to a reference surface on the first mounting head;
(b) measuring the distance between the displacement sensor and the reference surface;
(c) measuring the distance between the optical sensor and the first side of the web; and
(d) calculating the thickness of the moving web.

BRIEF DESCRIPTION OF THE DRAWINGS

FIG. 2A is a cross sectional schematic view of the lower scanner head illustrating the measurement surface and vacuum channels on the operative surface of the an air stabilizer and vacuum system;

FIGS. 2B and 2C are enlarged cross sectional views of Coanda nozzles;

DETAILED DESCRIPTION OF THE PREFERRED EMBODIMENTS

Figure 1:
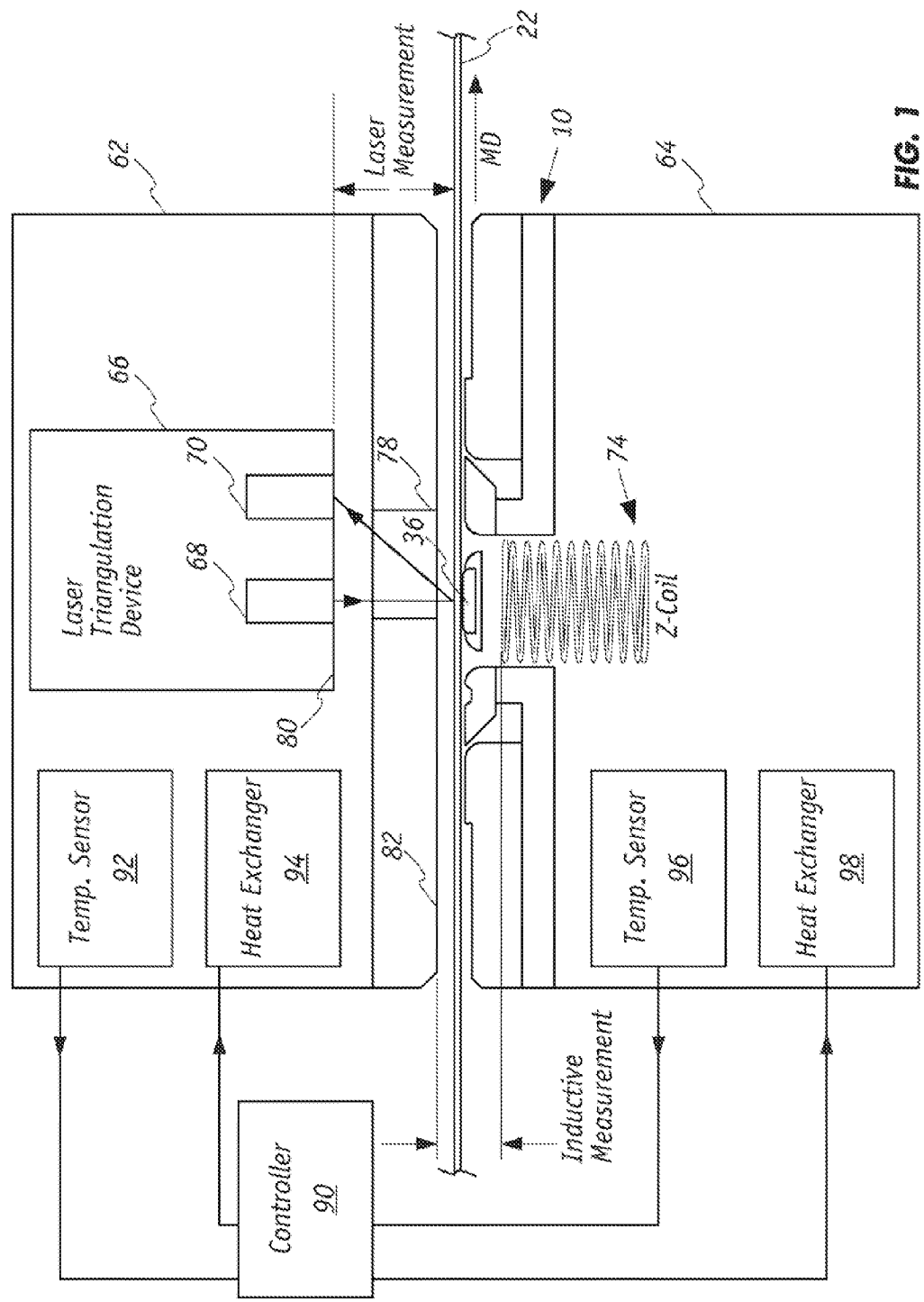
FIG. 1 is a cross sectional schematic view of a dual scanner head system employing the caliper measurement device.

FIG. 1 illustrates an embodiment of the non-contacting caliper sensor system that includes upper and lower sensing scanner heads 62 and 64, which are positioned on opposite sides of web or sheet 22. The two heads define a measurement gap and, if the caliper measurement is to be performed in a scanning manner across the web in the cross direction, the heads are aligned to travel directly across from each other as they traverse the moving web which is moving in the machine direction.

In a preferred embodiment, upper head 62 includes a laser triangulation device 66 that gauges the perpendicular distance between a base surface 80 of device 66 to the top of moving web 22 as the web is in contact with measurement surface 36. This operation being referred to as the laser measurement. Laser triangulation device 66 includes radiation source 68 and detector 70; incident radiation from source 68 passes through an aperture 78 in upper head 62 and detector 70 captures reflection radiation. From the measured path length from the source to the detector, values for the distance between base surface 80 and a measurement or interrogation spot on upper surface of the web 22 can be determined. The heads 62 and 64 are typically fixed in positions so that the interrogations spots do not move in the machine direction even as the heads are scanned in the cross direction. Laser triangulation devices are further described, for example, in U.S. Pat. No. 6,281,679 to King et al., and U.S. Pat. No. 7,528,400 to Duck and Hughes, which are incorporated herein by reference.

As further illustrated in FIG. 1, lower head 64 incorporates an air clamp and vacuum assembly 10 which supports moving web 22 and which initially flattens the contour of the moving web as it approaches measurement surface 36 and then holds web 22 in contact with measurement surface 36 as web 22 passes over it. In addition, lower head 64 includes a displacement or distance measurement apparatus that measures the distance from the apparatus to a reference surface that is positioned above web 22. A preferred apparatus is an inductive-type sensor that has an RF or z-coil 74, which is positioned directly below measurement surface 36 and measures the distance from z-coil 74 to lower surface 82 of upper head 62. Suitable z-coils can be made of aluminum nitride. This latter operation being referred to as the inductive measurement. Lower surface 82 thus which serves as the reference surface or plate. Z coil sensors are described in U.S. Pat. No. 6,281,679 to King et al. and U.S. Pat. No. 4,160,204 Holmgren et al, which are incorporated herein by reference.

The caliper of a moving sheet 22 that travels between two heads 62, 64 is determined by making the laser measurement, d (optical), and inductive measurement, d (inductive). Thereafter, the thickness (t) of sheet 22 is calculated as being the difference between the two measurements with a constant offset, that is: t=d (inductive)−d (optical)−C. The offset constant is determined by calibration that is preferably conducted by taking a zero measurement when the sensor is offsheet, that is, when there is no sheet between the heads.

Because laser triangular device 66 and the z-coil 74 are located in separate scanner heads, 62 and 64, respectively, the two devices are effectively thermally isolated from each other. Given that both devices are susceptible to thermal drift, this arrangement eliminates thermal interaction between them. In this regard, the temperatures in the upper and lower heads can also be independently regulated with controller 90, which actuates heat exchangers 94 and 98 in response to signals from temperature sensors 92 and 96, respectively. Separating z-coil 74 from laser triangulation device 66 has the added benefit of allows the coil to operate with less "backloading" from conductive material located nearby. This allows for a cleaner inductive measurement. The laser and laser optomechanics can be made of conductive 'target' materials. Optomechanical components are preferably made of stiff materials with low coefficients of thermal expansion. Metallic materials are cheaper and easier to manufacture than complicated parts made of nonconductive materials such as ceramics.

A critical feature of the present invention is that moving web 22 remains in contact with measurement surface 36 to insure accurate and consistent thickness measurements. This is accomplished in part by employing an air clamp that supports and pulls the moving web toward measurement surface and one or more vacuum channels, which are disposed on the operative surface adjacent the measurement surface, which holds the moving web against the measurement surface.

Suitable air clamps or stabilizers include an operative surface and one or more nozzles that are disposed on the operative surface. As a moving web travels above the operative surface, gas jets from the nozzles establish pressure fields that support and maintain the moving web at a desired distance from the operative surface. Air clamps are described, for example, in U.S. Pat. No. 6,9356,137 to Moeller et al., U.S. Pub. Nos. 2009/0260771 to Alev et al., 2009/0260772 to Alev et al., and 2010/0078140 to Hughes, which are all incorporated herein by reference.

FIG. 2A illustrates an air clamp and vacuum assembly 10 that incorporates opposite-facing nozzles that are configured with backsteps to generate suction forces that are applied to a moving web 22. The assembly 10 includes a body that is segmented into a ceramic central region 12, polymer lateral region 14A and polymer lateral region 14B. Central region 12 has an operative surface 32 that is situated between Coanda nozzles 16A and 16B, which are in gaseous communication with chambers 18A and 18B, respectively. Coanda nozzles 16A and 16B exhaust jets of gas in opposite directions toward surface 34A and 34B, respectively, which are downstream of the backstep features of nozzles.

Chamber 18A is connected to plenum chamber 46A which in turn is connected to a source of gas 24A via conduit 30A. The gas flow rate into plenum 46A can be regulated by conventional means including pressure controller 28A and flow regulator valve 26A. Plenum 46A essentially serves as a reservoir in which high pressure gas equilibrates before being evenly distributed along the length of Coanda nozzle 16A via chamber 18A. Similarly, chamber 18B is in gaseous communication with plenum chamber 46B, which is connected to a source of gas 24B via conduit 3013. Gas flowing into plenum 46B is regulated by pressure controller 28B and flow regulator valve 26B. Any suitable gas can be employed in gas sources 24A and 24B including for example, air, helium, argon, carbon dioxide.

Central region 12 includes a lower compartment 4 that houses a z-coil (not shown) that serves as the z-direction source/detector of a z-sensor. Positioned immediately above compartment 4 is hard ceramic disk 2 that is partially housed in enclosure 6. A preferred material for the disk is zirconium. The planar, upper surface of disk 2 serves as the measurement surface 36. Encircling at least a portion of the outer perimeter of enclosure 6 is vacuum channel 58 and upstream from vacuum channel 58 is vacuum channel 8. Both vacuum channels 58 and 8 are connected to a venturi vacuum pump 38 via conduit 48.

As illustrated in FIG. 2B, Coanda nozzle 16A has a Coanda slot 40 between upper surface 44 and operative surface 32 which are preferably coplanar. Coanda slot 40 has a curved convex surface 42 on its downstream side, with a radius of curvature (R) typically ranging from about 1.0 mm to about 10 mm. Airflow from the Coanda slot 40 follows the trajectory of the curved surface 42. The term "backstep" is meant to encompass a depression on the stabilizer surface located a distance downstream from Coanda slot 40 preferably sufficient to create a vortex. The combination of the Coanda slot and backstep generates an amplified suction force and an extensive air bearing.

Backstep 20 is most preferably configured as a 90 degrees vertical wall. Preferably, Coanda slot 40 has a width (b) of about 3 mils (76 μm) to 5 about mils (127 μm). The distance (d) from the upper surface 44 to lower surface 34A, which are preferably parallel to each other, is preferably between about 100 to 1000 μm. Preferably the backstep location (L) is about 1 mm to about 6 mm and preferably about 2 mm to 3 from Coanda slot 40.

Similarly, as shown in FIG. 2C, Coanda nozzle 16B has a Coanda slot 50 between upper surface 54 and coplanar operative surface 32. Coanda slot 50 has a curved surface 52 on its downstream side. The dimensions of structures forming Coanda nozzle 16B, including backstep 30 and lower surface 34B, can be the same as those for Coanda nozzle 16A.

Referring to FIG. 2A, the air clamp and vacuum assembly 10 is positioned underneath a web of material 22 which is moving from left to right relative to the assembly; this direction from the web entry end to the web exit end through the measurement gap being the downstream machine direction (MD) and the opposite direction being the upstream machine direction. The cross direction (CD) is transverse to the M.D. Operative surface 32 and measurement surface 36 are preferably not coplanar. The measurement surface is raised between 0.005 in. (0.127 mm) to 0.020 in. (0.508 mm) above the operative surface. The middle part of web 22 that is passing over operative surface 32 is not shown for clarity.

The contour of web 22 as it travels over operative surface 32 is manipulated with the air clamp and vacuum channels. In a preferred application, the profile of web 22 is substantially planar as in approaches measurement surface 36. The subambient pressure generated by vacuum channels 8 and 58 urges web 22 toward and into physical contact with measurement surface 36. The higher the vacuum levels, the greater the suction force imparted on moving web 22.

The thickness measurement devices of the present invention can be incorporated into on-line dual head scanning sensor systems for papermaking machines, which are disclosed in U.S. Pat. No. 4,879,471 to Dahlquist, U.S. Pat. No. 5,094,535 to Dahlquist et al., and U.S. Pat. No. 5,166,748 to Dahlquist, all of which are incorporated herein by reference. Besides the thickness of paper, other materials such as plastics, fabrics and the like can also be measured. The width of the paper in the papermaking machines generally ranges from 5 to 12 meters and typically is about 9 meters and travels at speeds of 200 m/min to 1800 m/min or higher.

Figure 3:
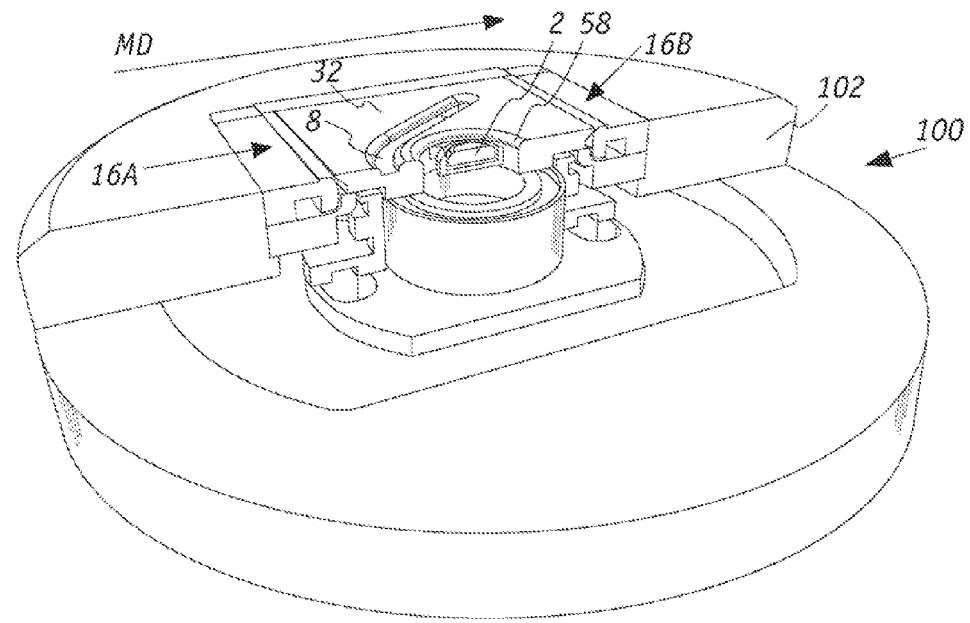
FIG. 3 shows a perspective cross sectional view of the web thickness measurement device as part of a sensor head.
Figure 4:
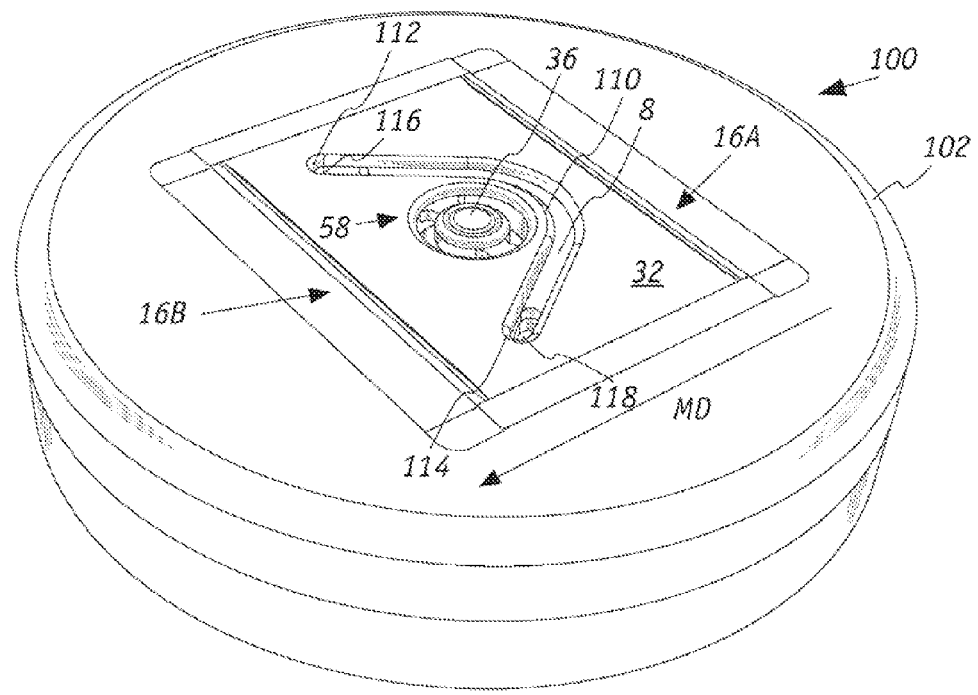
FIG. 4 shows a perspective view of the operative surface of the measurement device as part of the sensor head.

FIGS. 3 and 4 show an air clamp and vacuum assembly that is incorporated into a recess compartment within polymer substrate 102 that is a part of lower head 100 of a dual scanning sensor. The upper surface of disk 2 serves as measurement surface 36, which is located in the middle of operative surface 32 between Coanda nozzles 16A and 16B. Vacuum channel 58 has a ring structure that encircles measurement surface 36 and vacuum channel 8, which has a curved, arch-shaped configuration that partially encircles vacuum channel 58. As shown in FIG. 3, vacuum channel 8 has a proximal end 110 and distal ends 112 and 114 where gas vacuum ports 116 and 118, respectively are located. Substrate 102 is positioned so that as a web product travels toward operative surface 32 in the machine direction (MD), the web after traveling over Coanda nozzle 16A encounters the forces generated by vacuum channels 8 and 58. The web's contour is flattened as it approaches measurement surface 36 and is held thereon as it passes over the surface.

When employed for measuring the caliper of paper, in one embodiment, the distance between nozzles 16A and 16B is about 50 mm and the length of each nozzle along the cross direction is about 75 mm. The zirconium disk 2 has a diameter of 0.375 inches (0.95 cm).

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A detector device for contact support of a flexible continuous web being monitored and that is moving in a downstream machine direction, which comprises:
   (a) a first mounting head disposed on a first side of the moving web;
   (b) a second mounting head disposed on a second side of the moving web and which comprises a body having an operative surface facing the second side of the web wherein the operative surface defines a measurement surface with a perimeter and has a web entry end and a web exit end that is downstream from the web entry end;
   (c) a displacement sensor that is positioned in the second mounting head to determine a distance from the displacement sensor to a reference surface on the first mounting head;
   (d) an optical sensor, positioned in the first mounting head, for measuring the distance from the optical sensor to the first side of the moving web at the measurement surface wherein the optical sensor is thermally isolated from the displacement sensor;
   (e) means for positioning the moving web such that the second side of the web comes into contact with the measurement surface as the web passes over the measurement surface, which comprises a first channel that is disposed on the operative surface and which encircles at least part of the perimeter of the measurement surface wherein sub-ambient pressure from the first channel holds the moving web against the measurement surface and a second channel that is disposed on the operative surface and which has an arch-shaped configuration that partially encircles the first channel wherein the second channel comprises an indentation in the operative surface and which has a proximal end located upstream of the measurement surface and first and second distal ends located downstream of the measurement surface with the first distal end having a first gas vacuum port and the second distal end having a second gas vacuum port; and
   (f) means for regulating the temperatures of the first mounting head and of the second mounting head.

2. The detector device of claim 1 wherein the displacement sensor comprises an inductive-type sensor that has an RF coil.

3. The detector device of claim 1 wherein the means for positioning the moving web comprises an air-clamp that pulls the moving web toward measurement surface.

4. The detector device of claim 1 wherein the first channel has a ring structure that encircles the measurement surface.

5. The detector device of claim 1 wherein the first and second vacuum ports are connected to a vacuum pump.

6. The detector device of claim 1 wherein the optical sensor comprises a source of incident radiation that is directed toward the moving web and on an interrogation area on the first side of the moving web and a detector for detecting reflected radiation from the interrogation area.

7. The detector device of claim 1 wherein the web comprises paper.

8. The detector device of claim 1 wherein the first operative surface forms the reference surface.

9. The detector device of claim 1 wherein the means for regulating the temperatures of the first mounting head and of the second mounting head comprises a heat exchanger that is in thermal communication with the first mounting head and the second mounting head.

10. A system for dynamic thickness measurements of a flexible continuous web, that has a first surface and a second surface, and which is moving in a downstream machine direction (MD) that comprises:
   (a) a first mounting head disposed adjacent to the first side of the web, the first mounting head including:
      (i) a first operative surface facing the first side of the web; and
      (ii) an optical sensor for measuring the distance from the optical sensor to the first side of the web; and
   (b) a second mounting head disposed adjacent to the second side of the web, the second mounting head comprising:
      (i) a body having a second operative surface facing the second side of the web wherein the second operative surface defines a measurement surface with a perimeter wherein the first operative surface and the second operative surface define a measurement gap, that has a web entry end and a web exit end that is downstream from the web entry end, through which the continuous web travels;
      (ii) an air stabilizer that supports the flexible continuous web as the web travels through the measurement gap, wherein the air stabilizer comprises:
         (1) a first nozzle, positioned on the second operative surface at the web entry end, that defines a first slot that extends across the second operative surface along a first direction that is transverse to the MD and wherein a first elongated jet of pressurized gas is exhausted through the first slot and moves toward an upstream MD to impart a first controlled force on the web and the first nozzle comprises a slot in the body that is in fluid communication with a first source of gas; and
         (2) a second nozzle, positioned on the second operative surface at the web exit end, that defines a second slot that extends across the second operative surface along a second direction that is transverse to the MD. wherein a second elongated jet of pressurized gas is simultaneously exhausted through the second slot and moves toward a downstream MD to impart a second controlled force on the web and whereby the first force and the second force draws at least a portion of the moving web, that is located between the web entry end and the web exit end, toward the second operative surface and the second nozzle comprises a slot in the body that is in fluid communication with a second source of gas
      (iii) a first vacuum channel formed on the second operative surface that applies a suction force on the web to maintain the web in contact with the measurement surface as the web passes over the measurement surface, wherein the first vacuum channel is connected to a vacuum pump and encircles at least a part of the perimeter of the measurement surface;
      (iv) a second vacuum channel that is disposed on the second operative surface and which has an arch-shaped configuration that partially encircles the first vacuum channel wherein the second vacuum channel comprises an indentation in the second operative surface and which has a proximal end located upstream of the measurement surface and first and second distal ends located downstream of the measurement surface with the first distal end having a first gas vacuum port and the second distal end having a second gas vacuum port and wherein the first vacuum channel and the second vacuum channel are positioned between the first nozzle and the second nozzle; and
(v) a displacement sensor that determines a distance from the displacement sensor to a reference surface on the first mounting head wherein the optical sensor is thermally isolated from the displacement sensor.

11. The system of claim 10 wherein the second vacuum channel flattens the contour of the moving web as the web approaches the measurement surface.

12. The system of claim 10 wherein the first nozzle has a first elongated opening at a first surface of the body wherein the first slot has a first curved convex surface at the first elongated opening on its upstream side and wherein the second nozzle has a second elongated opening at a second surface of the body wherein the second slot has a second curved convex surface at the second elongated. opening on its downstream side.

13. The system of claim 12 wherein first elongated opening is disposed on a first segment of the second operative surface which has a first upper portion and a first lower portion that is upstream from the first upper portion and the second elongated opening is disposed on a second segment of the second operative surface which has a first upper portion and a first lower portion that is downstream from the first upper portion.

14. The system of claim 13 wherein the first upper portion is vertically spaced from the first lower portion and the second upper portion is vertically spaced from the second lower portion.

15. The system of claim 10 wherein the first operative surface and the second operative surface are planar surfaces which are aligned and parallel to each other.

16. The system of claim 10 wherein the vacuum pump is not in gaseous communication with either the first source of gas or the second source of gas.

17. The system of claim 10 further comprising means for means for regulating the temperatures of the first mounting head and of the second mounting head.

18. A method of measuring the thickness of a flexible continuous web that is moving in a downstream machine direction (MD)) along a path that comprises the steps of
(a) maneuvering the continuous web through a dual scanner head that comprises:
(i) first mounting head disposed adjacent to a first side of the web, the first mounting head including:
(A) a first operative surface facing the first side of the web, and
(B) an optical sensor for measuring the distance from the optical sensor to the first side of the web; and
(ii) a second mounting head disposed adjacent o the second side of the web, the second mounting head comprising:
(A) a body having a second operative surface facing the second side of the web wherein the second operative surface defines a measurement surface with a perimeter wherein the first operative surface and the second operative surface define a measurement gap, that has a web entry end and a web exit end that is downstream from the web entry end, through which the continuous web travels;
(B) an air stabilizer that supports the flexible continuous web as the web travels through the measurement gap;
(C) a first vacuum channel formed on the second operative surface which encircles at least a part of the perimeter of the measurement surface and that applies a suction force on the web to maintain the web in contact with the measurement surface as the web passes over the measurement surface;
(D) a second vacuum channel that is disposed on the second operative surface and which has an arch-shaped configuration that partially encircles the first vacuum channel wherein the second vacuum channel comprises an indentation in the second operative surface and which has a proximal end located upstream of the measurement surface and first and second distal ends located downstream of the measurement surface with the first distal end having a first gas vacuum port and the second distal end having a second gas vacuum port; and
(E) a displacement sensor that determines a distance from the displacement sensor to a reference surface on the first mounting head, wherein the optical sensor is thermally isolated from the displacement sensor;
(b) measuring the distance between the displacement sensor and the reference surface;
(c) measuring the distance between the optical sensor and the first side of the web;
(d) calculating, the thickness of the moving web; and
(e) controlling the temperatures of the first mounting head and the temperature of the second mounting head.

19. A method of measuring the thickness of a flexible continuous web that is moving in a downstream machine direction (MD) along a path that comprises the steps of
(a) maneuvering the continuous web through a dual scanner head that comprises:
(i) first mounting head disposed adjacent to a first side of the web, the first mounting head including:
(A) a first operative surface facing the first side of the web; and
(B) an optical sensor for measuring the distance from the optical sensor to the first side of the web: and
(ii) a second mounting head disposed adjacent to the second side of the web, the second mounting head comprising:
(A) a body having a second operative surface facing the second side of the web wherein the second operative surface defines a measurement surface with a perimeter wherein the first operative surface and the second operative surface define a measurement gap, that has a web entry end and a web exit end that is downstream from the web entry end, through which the continuous web travels;
(B) an air stabilizer that supports the flexible continuous web as the web travels through the measurement gap wherein the air stabilizer comprises:
(1) a first nozzle, positioned on the second operative surface at the web entry end, that defines a first slot that extends across the second operative surface along a first direction that is transverse to the MD and wherein a first elongated jet of pressurized gas is exhausted through the first slot and moves toward an upstream MD to impart a first controlled force on the web and wherein the first nozzle comprises a slot in the body that is in fluid communication with a first source of gas; and
(2) a second nozzle positioned on the second operative surface at the web exit end, that defines a second slot that extends across the second operative surface along a second direction that is transverse to the MD, wherein a second elongated jet of pressurized gas is simultaneously exhausted through the second slot and moves toward a downstream MD to impart a second controlled force on the web and whereby the first force and the second force draws at least a portion of the moving web, that is located between the web entry end and the web exit end, toward the second operative surface and the second nozzle comprises a slot in the body that is in fluid communication with a second source of gas;

(C) a first vacuum channel firmed on the second operative surface that applies a suction force on the web to maintain the web in contact with the measurement surface as the web passes over the measurement surface wherein the first vacuum channel is connected to a vacuum pump and encircles at least a part of the perimeter of the measurement surface;

(D) a second vacuum channel that is disposed on the second operative surface and which has an arch-shaped configuration that partially encircles the first vacuum channel wherein the second vacuum channel comprises an indentation in the second operative surface and which has a proximal end located upstream of the measurement surface and first and second distal ends located downstream of the measurement surface with the first distal end having a first gas vacuum port and the second distal end having a second as vacuum port and wherein the first vacuum channel and second vacuum channel are located between the first nozzle and second nozzle; and (E) a displacement sensor that determines a distance from the displacement sensor to a reference surface on the first mounting head;

(b) measuring the distance between the displacement sensor and the reference surface;

(c) measuring the distance between the optical sensor and the first side of the web; and (d) calculating, the thickness of the moving web.

20. The method claim 19 wherein the vacuum pump is not in gaseous communication with either the first source of gas or the second source of gas.

21. The method of claim 19 wherein the optical sensor is thermally isolated from the displacement sensor and further comprising the step of controlling the temperatures of the first mounting head and of the second mounting head.

* * * * *